No. 667,857. Patented Feb. 12, 1901.
A. E. A. WATHIER.
PIPE CUTTING TOOL.
(Application filed May 22, 1900.)
(No Model.)
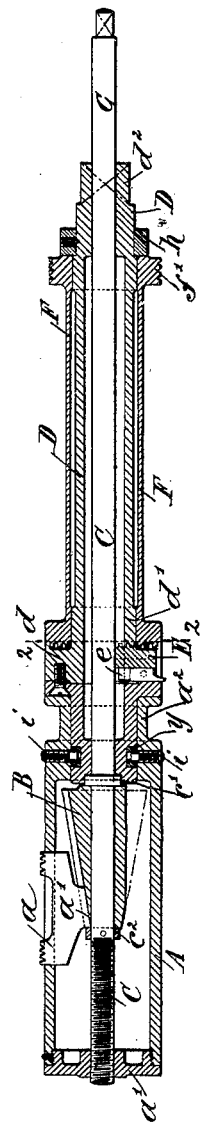
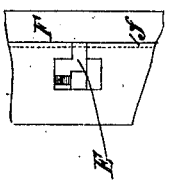
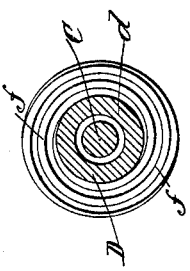
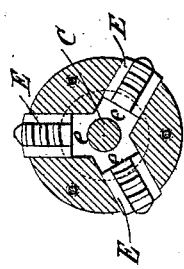
Witnesses:
C. Holloway
W. C. Pinckney
Inventor:
Alexis E. A. Wathier,
By J. E. M. Bowen
Attorney
THE NORRIS PETERS CO., PHOTO-LITHO., WASHINGTON, D. C.

UNITED STATES PATENT OFFICE.

ALEXIS EUGÈNE ALFRED WATHIER, OF HOMÉCOURT, FRANCE.

PIPE-CUTTING TOOL.

SPECIFICATION forming part of Letters Patent No. 667,857, dated February 12, 1901.

Application filed May 22, 1900. Serial No. 17,540. (No model.)

*To all whom it may concern:*

Be it known that I, ALEXIS EUGÈNE ALFRED WATHIER, engineer, a citizen of the Republic of France, residing at Homécourt, Meurthe-et-Moselle, France, have invented a certain new and useful Pipe-Cutting Tool, of which the following is a specification.

The present invention relates to a tool specially intended for cutting metallic tubes, such as is required, for instance, in the case of cutting boiler-tubes. The cutting effect of this tool is similar to that of a lathe or rotary cutter.

In the accompanying drawings, representing the tool in question, Figure 1 is a longitudinal section; Fig. 2, a cross-section on the line 2 2 of Fig. 1 looking toward the left; Fig. 3, a cross-section along the same line looking toward the right. Fig. 4 is a partial plan view illustrating the mounting of the tool.

The apparatus consists of a sleeve or fixed body A, which serves as a support to the movable part of the apparatus. By means of this sleeve A the instrument may be fixed to the interior of the pipe by means of grips $a$, suitably arranged on the circumference and of which the inner side $a'$ is inclined or wedge-shaped and engages against a conical part B, loosely mounted on a central spindle C, and prevented from axial displacement on that spindle by a shoulder $c'$ and a ring $c^2$. The latter is fitted and fixed at the desired point on the spindle C, one end of which is cut square, while the other is inclosed within sleeve A and engages with the end $a'$ of said sleeve by means of a screw-thread. $a^2$ is a shoulder in said sleeve.

The movable part of the tool consists principally of a central tubular body D, in which are radially arranged tool-carriers E E, adapted to travel in grooves $e\ e$. In these grooves the part $d$ of body D supports tool-carriers E E over their whole lengths.

$d'$ is a part of body D receding from part $d$ for the purpose of releasing the tool-carriers on one of their faces, on which they engage with a sleeve F, arranged on the body D. By means of this sleeve F the tool-carriers may be so displaced in their grooves as to bring them in contact with the sides of the pipe to be cut and to advance in proportion as the depth of the cutting increases. For this purpose the sleeve F is provided on the face which is in contact with the tool-carriers E with a spiral groove of constant pitch, while the corresponding parts of the tool-carriers are provided with a series of parts of a screw-thread corresponding to the complete spiral $f$. By means of these screw-threaded parts the tool-carriers engage with the sleeve F. The sleeve F is provided at its other end with a shoulder $f'$, milled on its outer cylindrical surface, so as to allow of its being turned relatively to the sleeve D. A ring $h$ prevents any axial displacement of the sleeve F on the said sleeve D.

The tubular body D and the sleeve A are connected by a ring $y$, fixed, by means of two screws $i$, to the sleeve A.

The body D is provided at its end with a squared head $d^2$, on which can be fixed a key or spanner.

Operation of the instrument: The instrument is inserted in the pipe to be cut, so that the grippers $a\ a$ are below the place when the cut is to be made. By suitably turning the spindle C by means of its squared head its other screw-threaded end screws into the bottom $a'$ and the grippers $a$ are forced outward, owing to the wedge action of the part B in the fixed sleeve A, thus locking the cutter against the walls of the pipe to be cut. A tap-wrench, spanner, or the like is then applied to the squared end $d^2$ of the body D, applied by means of which the said body D, the tool-carriers E, and the sleeve F are connectedly turned, the tools attacking and cutting the walls of the pipe. To effect the forward movement of the tool in proportion as the depth of cutting increases, the sleeve F is turned relatively to the body D in the direction required by means of the shoulder $f'$, in consequence of which the tool-carriers are displaced in their grooves according to the spiral thread and according to the angle through which the said sleeve F has been turned.

It should be observed here that such a pipe-cutter of certain dimensions may serve for cutting pipes of various diameters. For this purpose it will be sufficient to be provided with a suitable number of sets of grippers $a$ and tool-carriers E.

I claim—

1. A tool for cutting pipes characterized by the combination of a fixed body A provided with a shoulder $a^2$ a movable sleeve D, tool-carriers E provided with parts of a spiral screw-thread, a sleeve F with a spiral thread at one of its ends, the other being provided with a milled shoulder $f'$ substantially as described.

2. A tool for cutting pipes characterized by the combination of a fixed body A with a suitable number of grippers $a$ with inclined inner sides so as to press against a conical part B loosely mounted on a central spindle C on which the said conical piece is prevented from axial displacement by a shoulder $c'$ and a ring $c^2$, one of the ends of the spindle being provided with a square head and the other with a screw-thread passing through the end or bottom $a'$ of the fixed piece A substantially as described.

Signed at the United States consulate, Rheims, France, this 9th day of May, 1900.

ALEXIS EUGÈNE ALFRED WATHIER.

Witnesses:
FORCEBOD,
A. DOME.